US012060946B2

(12) United States Patent
Docherty et al.

(10) Patent No.: US 12,060,946 B2
(45) Date of Patent: Aug. 13, 2024

(54) VALVE SEAT WITH CERAMIC INSERT

(71) Applicant: SPM Oil & Gas Inc., Fort Worth, TX (US)

(72) Inventors: Connor James Docherty, Fort Worth, TX (US); Ralph E. Harris, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 163 days.

(21) Appl. No.: 17/905,363

(22) PCT Filed: Mar. 23, 2021

(86) PCT No.: PCT/US2021/023746
§ 371 (c)(1),
(2) Date: Aug. 31, 2022

(87) PCT Pub. No.: WO2021/195123
PCT Pub. Date: Sep. 30, 2021

(65) Prior Publication Data
US 2023/0106466 A1 Apr. 6, 2023

Related U.S. Application Data

(60) Provisional application No. 62/993,515, filed on Mar. 23, 2020.

(51) Int. Cl.
*F16K 1/42* (2006.01)
*E21B 43/26* (2006.01)
(Continued)

(52) U.S. Cl.
CPC ............. *F16K 1/42* (2013.01); *F04B 1/0456* (2013.01); *F04B 53/1025* (2013.01); *F16K 1/46* (2013.01);
(Continued)

(58) Field of Classification Search
CPC ...... F04B 53/1087; F16K 1/42; F16K 15/063; Y10T 137/7559; Y10T 137/7866; Y10T 137/78768; Y10T 137/7929
(Continued)

(56) References Cited

U.S. PATENT DOCUMENTS 2,163,472 A * 6/1939 Shimer ................ F16K 15/063
137/902
7,726,026 B1 6/2010 Blume
(Continued)

FOREIGN PATENT DOCUMENTS

WO 2019/169312 A1 9/2019

OTHER PUBLICATIONS

International Search Report and Written Opinion issued in Application No. PCT/US2021/023746; Dated Jul. 23, 2021, 7 Pages.

*Primary Examiner* — Robert K Arundale

(57) ABSTRACT

A valve seat for a valve assembly for a high-pressure fluid pump is disclosed. The valve assembly includes a valve body, and a valve seat fabricated of a first material. The valve seat has a generally a tubular body having an annular collar having an outer diameter surface extending beyond the outer diameter surface of the tubular body, and an annular insert fabricated of a second material more durable than the first material and affixed to form an inner diameter surface of the collar, the insert forming an annular sealing surface against which the valve body abuts when in a closed position. The insert forms an annular ledge edge at its inner diameter surface that is offset from the inner diameter surface of the tubular body to form an annular chamfered edge.

20 Claims, 3 Drawing Sheets

(51) Int. Cl.
  *F04B 1/0456* (2020.01)
  *F04B 53/10* (2006.01)
  *F16K 1/46* (2006.01)
  *F16K 15/06* (2006.01)

(52) U.S. Cl.
  CPC ........ *F16K 15/063* (2013.01); *E21B 43/2607* (2020.05); *F04B 53/1087* (2013.01); *Y10T 137/7868* (2015.04)

(58) Field of Classification Search
  USPC ........................................................ 251/332
  See application file for complete search history.

(56) References Cited

U.S. PATENT DOCUMENTS

| | | |
|---|---|---|
| 9,631,739 B2 | 4/2017 | Belshan et al. |
| 9,822,894 B2 | 11/2017 | Bayyouk et al. |
| 10,344,757 B1 | 7/2019 | Stark et al. |
| 11,384,756 B1* | 7/2022 | Smith .................... F04B 1/0461 |
| 11,566,713 B2* | 1/2023 | Poremski .................. F16K 3/30 |
| 11,920,684 B1* | 3/2024 | Xu .......................... F16K 1/427 |
| 2019/0040966 A1* | 2/2019 | Myers .................... F04B 39/10 |

* cited by examiner

VALVE SEAT WITH CERAMIC INSERT

CROSS-REFERENCE TO RELATED APPLICATIONS

This Patent Application is a 371 national stage of PCT Application No. PCT/US2021/023746 filed on Mar. 23, 2021, entitled "VALVE SEAT WITH CERAMIC INSERT," which claims priority to U.S. Provisional Application No. 62/993,515, filed on Mar. 23, 2020, entitled "VALVE SEAT WITH CERAMIC INSERT," and assigned to the assignee hereof. The disclosures of the prior Applications are considered part of and are incorporated by reference into this Patent Application.

FIELD

The present disclosure relates to valves for high pressure fluid applications, and more particularly, to a valve seat with a ceramic insert for a reciprocating pump.

BACKGROUND

Hydraulic fracturing (a.k.a. fracking) is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried.

Positive displacement pumps are commonly used in oil fields for high pressure hydrocarbon recovery applications, such as injecting the fracking fluid down the wellbore. A positive displacement pump may include one or more plungers driven by a crankshaft to create a high or low pressure in a fluid chamber. A positive displacement pump typically has two sections, a power end and a fluid end. The power end includes a crankshaft powered by an engine that drives the plungers. The fluid end of the pump includes cylinders into which the plungers operate to draw fluid into the fluid chamber and then forcibly push out at a high pressure to a discharge manifold, which is in fluid communication with a well head.

DETAILED DESCRIPTION

Figure 1:
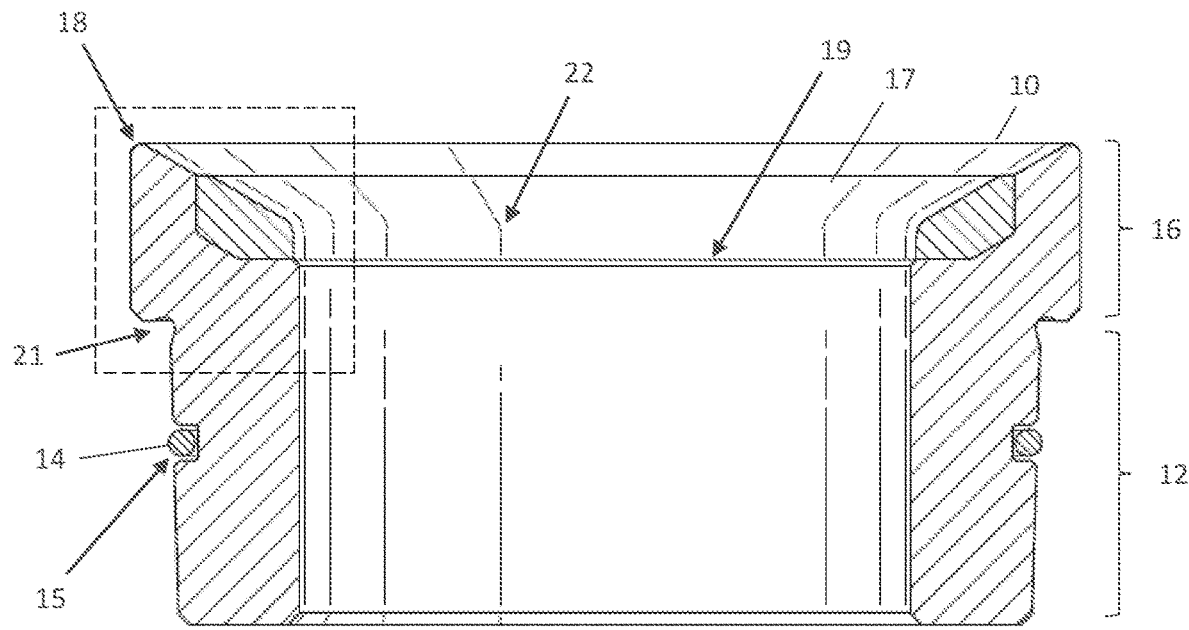
FIG. 1 is a cross-sectional view of an embodiment of a valve seat with a ceramic insert according to the teachings of the present disclosure.

Referring to FIG. 1, a cross-sectional view of a valve seat 10 for a fluid inlet valve assembly 40 and/or a fluid outlet valve assembly 40 of a reciprocating pump 50 (FIG. 5) is shown. The inlet valve assembly 40 is disposed in a fluid inlet passage and the outlet valve assembly is disposed in the fluid outlet passage in the fluid end 54 of the pump 50. The valve assemblies 40 may incorporate a spring 42 so that they are spring-loaded. The valve seat 10 described herein is applicable to both the inlet and the outlet valve assemblies, which are hereinafter referred to as the valve assembly without distinction.

The valve assembly 40 includes a valve seat 10 (FIGS. 1 and 2) and a valve body 30 (an example shown in FIG. 3) engaged therewith. The valve body 30, when in its closed position, is seated and engaging the circular opening defined by the valve seat 10. When in its open position, the valve body 30 is lifted away and spaced from the opening defined by the valve seat 10. The valve seat 10 includes a generally tubular body 12 having an inner diameter surface and an opposing outer diameter surface. The inner diameter surface of the valve seat 10 forms a cylindrical bore along a center axis of the valve seat 10, which is coaxial with the fluid passage axis when the valve assembly 40 is disposed in the fluid inlet/outlet passage. The outer diameter surface of the valve seat body 12 contacts and engages an inside surface of the fluid passageway. In an exemplary embodiment, the outer diameter surface of the valve seat forms an interference fit with the wall of the fluid passageway. A sealing element 14, such as an O-ring, is disposed in an annular groove 15 formed in the outer diameter surface of the tubular valve body 12 to sealingly engage the inside surface of the fluid inlet passage. The valve seat body 12 forms an interference fit or is press fit against the inside surface of the fluid cylinder so that the valve seat 10 is securely disposed within the fluid inlet passage. According to certain embodiments, at least a portion of the valve seat 10 and valve body 30 is fabricated from a metal such as carbon steel or stainless steel.

Figure 2:
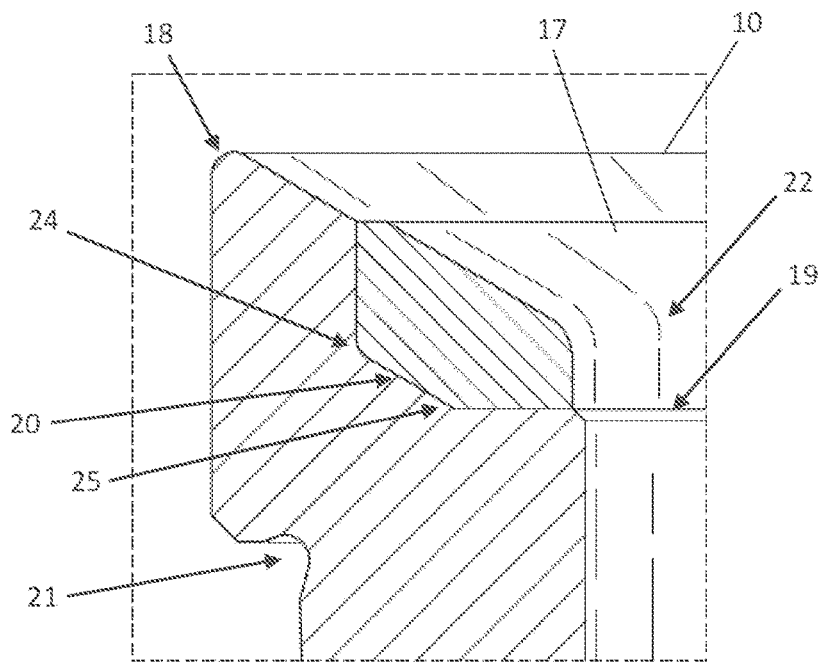
FIG. 2 is a partial close-up view of an embodiment of a valve seat with a ceramic insert according to the teachings of the present disclosure.
Figure 3:
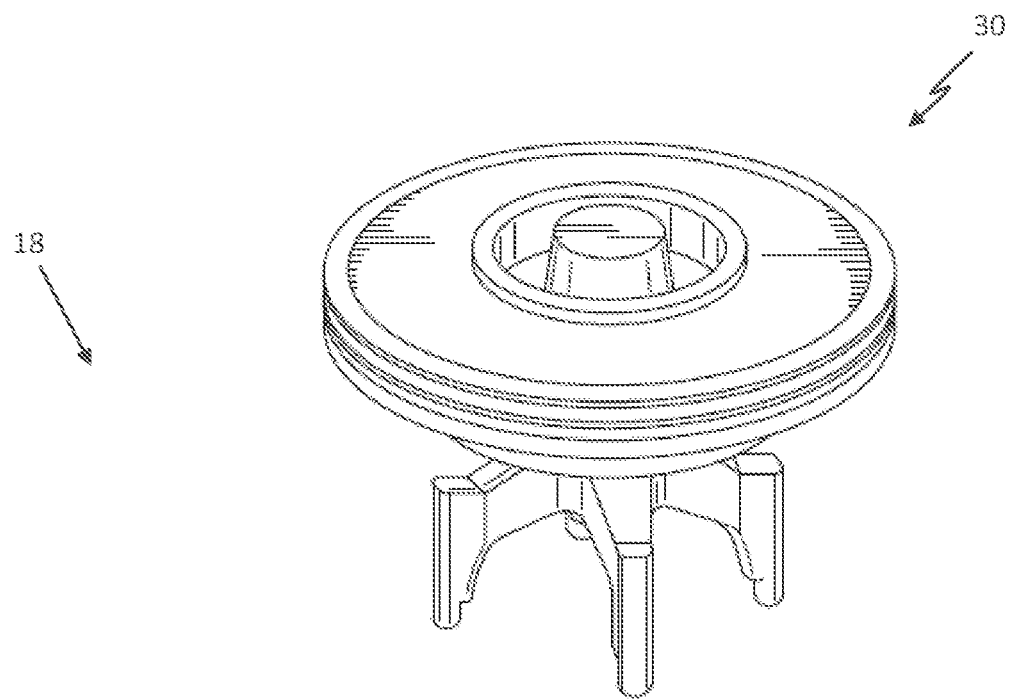
FIG. 3 is a perspective view of an example embodiment of a valve body according to the teachings of the present disclosure.
Figure 4:
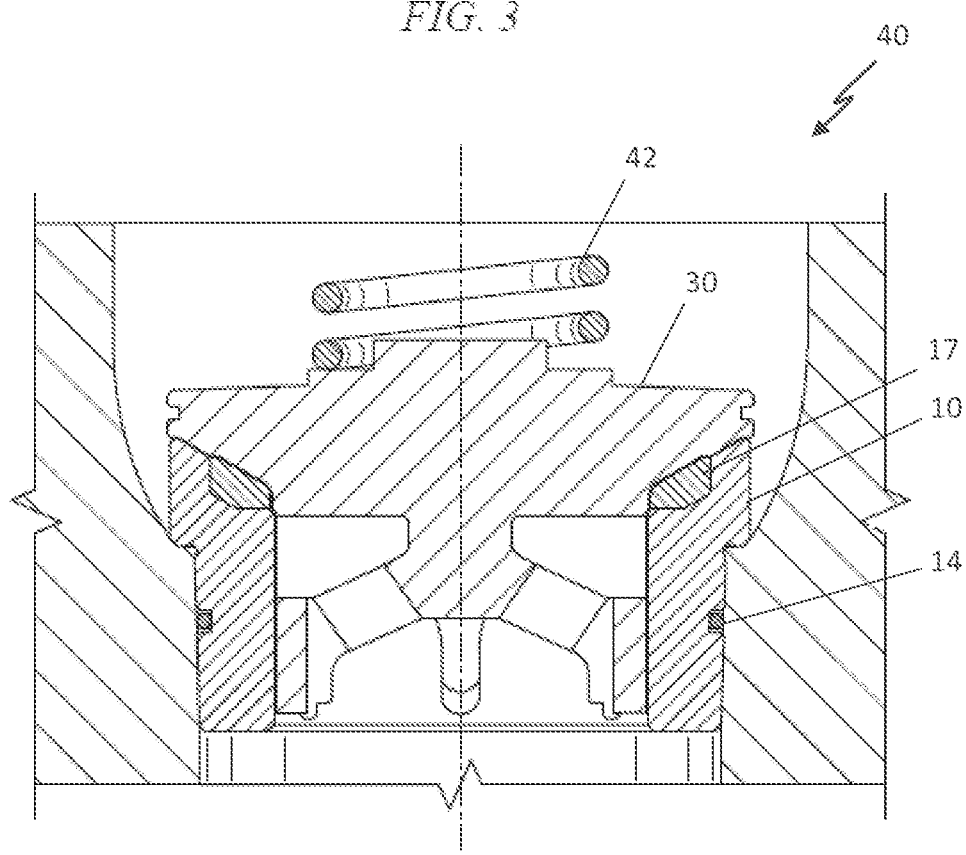
FIG. 4 is a cross-sectional view of an embodiment of a valve assembly according to the teachings of the present disclosure.

The valve seat 10 further includes a collar 16 with an insert 17 that has a tapered or curved shoulder 18 that extends upwardly and radially from the tubular body 12. At a horizontally-oriented interface at the inner diameter surface between the collar 16 and the insert 17 is a chamfer edge 19, so that the insert 17 is slight recessed from the inner diameter surface of the insert body 12, as best seen in FIG. 2. This chamfered edge 19 may be formed by machining, for example. In contrast, the conventional insert has an inner diameter bore surface that is flush with the valve seat body inner diameter surface. In this embodiment shown in FIGS. 1 and 2, the back face of the insert 10 has an angled face 20 that results in the back face of the insert having two angles 24 and 25 that are both greater than 90 degrees. The outer surface of the collar 16 and tubular valve seat body 12 contact and abut against the inside surface of the fluid inlet passage. The collar 16 further includes an annular groove 21 that slightly undercuts into the outer surface of the tubular valve seat body 12. The curved shoulder 18 of the collar 16 extends at an angle from the tubular valve seat body 12. The collar 16 has an outer diameter that is greater than the outer diameter of the tubular valve seat body 12. The valve seat insert 17 is affixed to an upper inside surface of the valve seat collar 16 by press-fit, shrink-fit, bonding, sintering, welding or combinations thereof. The insert 17 has a curved shoulder 18 that flares radially outward and an annular inner diameter ledge 22 that is disposed above the chamfered edge 19.

In an exemplary, non-limiting embodiment, the insert 17 is made or fabricated of a ceramic material that may include zirconia, partially stabilized zirconia, a tungsten carbide such as tungsten carbide nickel, or tungsten carbide cobalt, titanium carbide, silicon nitride, or sialon. The hardness of the ceramic material may range from about 12 to 22 GPa with reference to the Vickers hardness number. In certain embodiments, the entire valve seat 10 and the valve body 30 may be formed from ceramic material or only a portion of one or both of the valve seat and the valve body may be formed from the ceramic material. Generally, it is desirable to use a ceramic insert material that is of a greater hardness than the valve seat body material. The use of an insert 17 thus extends the life span of the valve assembly 40, which is typically subject to corrosion, erosion, or pitting during pump operation.

Figure 5:
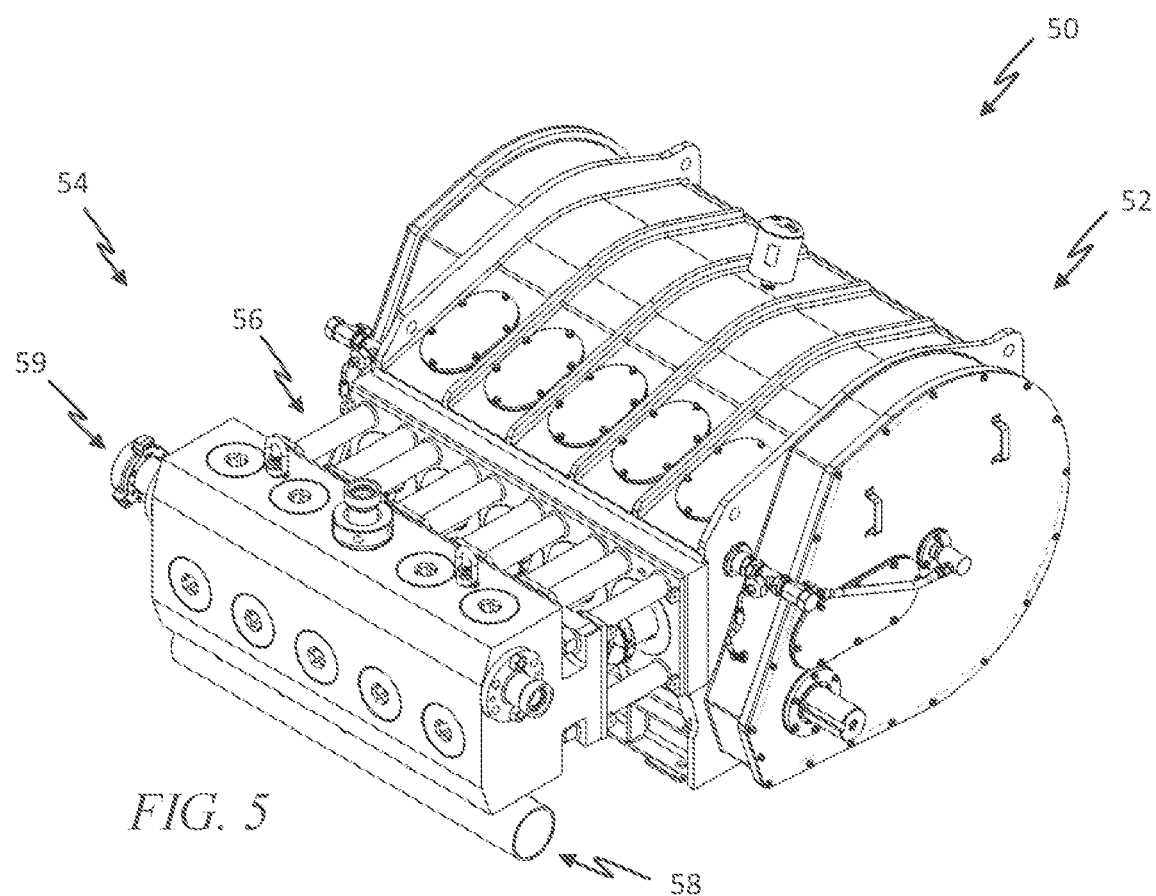
FIG. 5 is a perspective view of an example embodiment of a frac pump according to the teachings of the present disclosure.

FIG. 5 is a perspective view of an exemplary positive displacement pump 50 in which the embodiments of the novel valve seat configuration described here can be deployed. A positive displacement pump, also known as a frac pump, is typically driven by high horsepower diesel or turbine engines (not shown). The engine's revolutions-per-minute (RPM) is usually reduced through the use of a transmission. The transmission is usually multi-geared such that higher pump loads use lower gearing and lighter loads use higher gearing. The frac pump 50 comprises two major components: a power end 52 and a fluid end 54 held together by a stay rod assembly 56 that includes a plurality of stay rods and tubes. The power end 52 includes a crankshaft (not explicitly shown) powered by the engine (not explicitly shown) that drives a plurality of plungers (not explicitly shown). The fluid end 54 of the pump includes cylinders (not explicitly shown) into which the plungers operate to draw fluid from a suction manifold 58 into the fluid chamber and then forcibly push out at a high pressure to a discharge manifold 59. The discharged liquid is then injected at high pressure into an encased wellbore. The injected fracturing fluid is also commonly called a slurry, which is a mixture of water, proppants (silica sand or ceramic), and chemical additives. The frac pump increases pressure within the fluid cylinder by reciprocating the plunger longitudinally within the fluid head cylinder. The power end 52 further includes a pinion gear, bull gears, rod caps, bearing housing, connecting rods, crossheads, and pony rods that work together to reciprocate the plunger. Because of the extreme conditions under which a frac pump operates, some of which are discussed above, there is considerable wear and tear on the various component parts including the valve seats and valve bodies in the fluid end 54. Such wear and tear require constant maintenance, and ultimately, replacement of worn parts. Maintenance and repair result in machine downtime and increase the overall cost of oil and gas production.

The novel valve seat configuration described herein can be employed for any valve and seal present in the frac pump, as well as other types of equipment that may be present at an exemplary hydraulic fracturing site. An exemplary hydraulic fracturing site employs positive displacement pumps, a slurry blender, fracturing fluid tanks, high-pressure flow iron (pipe or conduit), trailers upon which some equipment are carried, valves, wellhead, charge pump (typically a centrifugal pump), conveyers, and other equipment at the site of a hydraulic fracturing operation or other types of hydrocarbon recovery operations.

The features of the present invention which are believed to be novel are set forth below with particularity in the appended claims. However, modifications, variations, and changes to the exemplary embodiments described above will be apparent to those skilled in the art, and the valve seat with ceramic insert described herein thus encompasses such modifications, variations, and changes and are not limited to the specific embodiments described herein.

What is claimed is:

1. A valve assembly for a high-pressure fluid pump, comprising:
   a valve body; and
   a valve seat fabricated of a first material and including:
      a tubular body having an inner diameter surface and an outer diameter surface;
   an annular sealing member disposed within an annular groove formed in the outer diameter surface of the tubular body,
      the tubular body having an annular collar having an outer diameter surface extending beyond the outer diameter surface of the tubular body; and
   an insert fabricated of a second material more durable than the first material and affixed to form an inner diameter surface of the collar,
      the insert forming an annular sealing surface against which the valve body abuts when in a closed position,
      the insert having an inner diameter surface that is offset from the inner diameter surface of the tubular body to be adjacent to an annular chamfered edge of the valve seat, and
      the insert having a back face formed by a first side intersecting with the back face at an angle greater than 90 degrees and by a second side intersecting with the back face at an angle greater than 90 degrees.

2. The valve assembly of claim 1,
   wherein the first material comprises one of carbon steel or stainless steel, and
   wherein the second material comprises a ceramic material.

3. The valve assembly of claim 1, wherein the tubular body defines an annular undercut groove in the outer diameter surface disposed below the collar.

4. The valve assembly of claim 1, further comprising a biasing member.

5. The valve assembly of claim 1, wherein the insert is affixed to the valve seat by one of press-fit, shrink-fit, bonding, sintering, or welding.

6. A valve seat for a valve in a high-pressure fluid pump, comprising:
   a tubular body fabricated of a first material and having an inner diameter surface and an outer diameter surface;
      the tubular body having an annular collar having an outer diameter surface extending beyond the outer diameter surface of the tubular body; and
   an insert fabricated of a second material more durable than the first material and affixed to form an inner diameter surface of the collar,
      the insert configured to form an annular sealing surface against which the valve body abuts when in a closed position,
      the insert having an inner diameter surface that is offset from the inner diameter surface of the tubular body to be adjacent to an annular chamfered edge of the valve seat, and
      the insert having a back face formed by a first side intersecting with the back face at an angle greater than 90 degrees and by a second side intersecting with the back face at an angle greater than 90 degrees.

7. The valve seat of claim 6, wherein the first material comprises one of carbon steel or stainless steel.

8. The valve seat of claim 6, wherein the second material comprises a ceramic material.

9. The valve seat of claim 6, wherein the tubular body further defines an annular undercut groove in the outer diameter surface disposed below the collar.

10. The valve seat of claim 6, further comprising an annular sealing member disposed within an annular groove formed in the outer diameter surface of the tubular body for sealingly engaging with a fluid passageway receiving the valve seat.

11. A valve assembly for a high-pressure fluid pump, comprising:
   a valve body; and
   a valve seat fabricated of a first material and including:
      a tubular body having an inner diameter surface and an outer diameter surface;
         the tubular body having an annular collar having an outer diameter surface extending beyond the outer diameter surface of the tubular body; and
      an insert fabricated of a second material more durable than the first material and affixed to form an inner diameter surface of the collar and forming an annular sealing surface against which the valve body abuts when in a closed position,
      the insert having an inner diameter surface that is offset from the inner diameter surface of the tubular body to be adjacent to an annular chamfered edge of the valve seat, and
      the insert having a back face formed by a first side intersecting with the back face at an angle greater than 90 degrees and by a second side intersecting with the back face at an angle greater than 90 degrees.

12. The valve assembly of claim 11, further comprising an annular sealing member disposed within an annular groove formed in the outer diameter surface of the tubular body.

13. The valve assembly of claim 11, wherein the first material comprises one of carbon steel or stainless steel.

14. The valve assembly of claim 11, wherein the tubular body defines an annular undercut groove in the outer diameter surface disposed below the collar.

15. The valve assembly of claim 11, further comprising a biasing member.

16. The valve assembly of claim 11, wherein the insert is affixed to the valve seat by press-fit.

17. The valve assembly of claim 11, wherein the second material comprises a ceramic material.

18. The valve assembly of claim 11, wherein the insert is affixed to the valve seat by shrink-fit.

19. The valve assembly of claim 11, wherein the insert is affixed to the valve seat by bonding.

20. The valve assembly of claim 11, wherein the insert is affixed to the valve seat by sintering or welding.

\* \* \* \* \*